United States Patent
Eaton et al.

(10) Patent No.: US 12,171,207 B2
(45) Date of Patent: Dec. 24, 2024

(54) TROLLING HEAD FOR A FISHING LURE

(71) Applicant: CMe Trolling, LLC, Cortland, NY (US)

(72) Inventors: Edward Eaton, Cortland, NY (US); Clifford Eaton, Cortland, NY (US)

(73) Assignee: CMe Trolling, LLC, Cortland, NY (US)

( * ) Notice: Subject to any disclaimer, the term of this patent is extended or adjusted under 35 U.S.C. 154(b) by 0 days.

(21) Appl. No.: 18/650,247

(22) Filed: Apr. 30, 2024

(65) Prior Publication Data

US 2024/0373833 A1 Nov. 14, 2024

Related U.S. Application Data

(60) Provisional application No. 63/501,311, filed on May 10, 2023.

(51) Int. Cl.
*A01K 85/00* (2006.01)
*A01K 85/01* (2006.01)

(52) U.S. Cl.
CPC ........ *A01K 85/1851* (2022.02); *A01K 85/011* (2022.02); *A01K 85/1853* (2022.02); *A01K 85/1867* (2022.02); *A01K 85/1897* (2022.02)

(58) Field of Classification Search
CPC .... A01K 85/1867; A01K 85/18; A01K 97/00; A01K 85/1851; A01K 85/1853; A01K 85/1857
USPC ........... 43/42.24, 42.34, 42.36, 42.35, 42.09, 43/42.38, 44.9, 42.08, 44.91, 42.05
See application file for complete search history.

(56) References Cited

U.S. PATENT DOCUMENTS

| | | | | |
|---|---|---|---|---|
| 2,241,851 A | * | 5/1941 | Gilstrap | A01K 93/00 43/43.15 |
| 2,741,067 A | * | 4/1956 | Cox | A01K 95/00 43/44.9 |
| 3,909,974 A | * | 10/1975 | Kent | A01K 85/00 43/42.31 |
| 5,600,916 A | * | 2/1997 | Smith | A01K 85/16 43/42.49 |

(Continued)

OTHER PUBLICATIONS

Clifford (Chip) Eaton, Facebook post "Monsters from the Great Lakes" Blinky Eye Fly, Jan. 19, 2022.

*Primary Examiner* — Darren W Ark
*Assistant Examiner* — Zoe Tam Tran
(74) *Attorney, Agent, or Firm* — Heslin Rothenberg Farley & Mesiti PC

(57) ABSTRACT

A trolling head includes first and second body portions. Each body portion includes a first end and a second end with a body portion thru-hole therebetween. Each body portion includes a mating surface extending from the first end to the second end. Each body portion includes a groove disposed within the mating surface, which extends from the first end to the second end. The mating surfaces of the first and second body portions are configured to attach together such that the grooves of the first and second body portions align to form a tunnel. The tunnel extends from the first ends to the second ends of the first and second body portions and is sized to receive a fishing line therethrough. The body portion thru-holes of the first and second body portions also align to form a trolling head thru-hole sized to receive a fish eye mimic therein.

20 Claims, 12 Drawing Sheets

(56) References Cited

U.S. PATENT DOCUMENTS

| | | | | |
|---|---|---|---|---|
| 5,784,828 | A * | 7/1998 | Thompson | A01K 95/00 43/44.87 |
| 5,926,993 | A * | 7/1999 | Marusak | A01K 85/16 43/42.34 |
| 6,061,948 | A * | 5/2000 | Boucek | A01K 85/00 43/42.39 |
| 7,240,454 | B2 * | 7/2007 | Guigo | A01K 91/04 43/44.9 |
| 7,481,020 | B1 * | 1/2009 | Ruzicka | A01K 93/00 43/44.87 |
| 8,627,594 | B1 * | 1/2014 | Weron | A01K 85/16 43/42.32 |
| 9,173,385 | B2 * | 11/2015 | Cooper | A01K 85/01 |
| 2006/0042147 | A1 * | 3/2006 | Jenkins | A01K 85/16 43/42.36 |
| 2006/0075678 | A1 * | 4/2006 | Schammel | A01K 97/04 43/42.09 |
| 2007/0289198 | A1 * | 12/2007 | Rodels | A01K 85/01 43/42.36 |
| 2008/0127542 | A1 * | 6/2008 | Young | A01K 85/00 43/42.24 |
| 2009/0293338 | A1 * | 12/2009 | Lu | A01K 95/02 43/43.1 |
| 2009/0307959 | A1 * | 12/2009 | Hughes | A01K 85/18 43/42.32 |
| 2010/0205849 | A1 * | 8/2010 | Choi | A01K 85/01 43/42.35 |
| 2011/0162254 | A1 * | 7/2011 | Smits | A01K 85/18 43/42.49 |
| 2015/0089859 | A1 * | 4/2015 | Jarvis, III | A01K 85/18 43/42.35 |
| 2016/0165866 | A1 * | 6/2016 | LaMey | A01K 85/18 43/42.09 |
| 2020/0116314 | A1 * | 4/2020 | Grandadam | F21L 4/027 |
| 2022/0167601 | A1 * | 6/2022 | Hancock | A01K 85/029 |

\* cited by examiner

Forming a trolling head, the trolling head comprising:

a trolling head body comprising a first end and a second end and having a trolling head thru-hole extending therebetween, the trolling head thru-hole configured to receive a fish eye mimic therein, and a tunnel extending from a tunnel entrance disposed in the first end of the trolling head body to a tunnel exit disposed in the second end of the trolling head body, the tunnel being configured to receive a fishing line therethrough and to route the fishing line around the trolling head thru-hole.

204

Threading a fishing line through the tunnel from the first end to the second end of the tunnel, wherein the threaded fishing line is routed around the trolling head thru-hole.

From figure 10
↓

206
Forming, via plastic injection molding process, a first body portion, the first body portion comprising:
    a first end and a second end with a body portion thru-hole therebetween,
    a mating surface extending from the first end to the second end,
    a groove disposed within the mating surface and extending from the first end to the second end, and
    a plurality of posts disposed on the mating surface of the first body portion and extending outwardly therefrom.

↓

208
Forming, via plastic injection molding process, a second body portion, the second body portion comprising:
    a first end and a second end with a body portion thru-hole therebetween,
    a mating surface extending from the first end to the second end,
    a groove disposed within the mating surface and extending from the first end to the second end, and
    a plurality of post holes disposed in the mating surface of the second body portion and extending at least partially into the second body portion.

↓

210
Inserting each post hole of the plurality of post holes into a post of the plurality of posts to attach and align the mating surfaces of the first and second body portions together.

↓

212
Aligning the body portion thru-holes of the first and second body portions to form the trolling head thru-hole.

↓

214
Aligning the grooves of the first and second body portions to form the tunnel, wherein the tunnel entrance is formed from the first ends of the first and second body portions, and wherein the tunnel exit is formed from the second ends of the first and second body portions.

From figure 11

216 — Each post of the plurality of posts includes a first locking mechanism attached thereto, and each post hole of the plurality of post holes includes a second locking mechanism attached thereto.

218 — Securing the plurality of posts to the plurality of post holes, when the mating surfaces of the first and second body portions are attached, by locking the first and second locking mechanisms together.

220 — Wherein the first and second locking mechanisms comprise an adhesive.

222 — Wherein the locking mechanism of each post includes a resilient annular flared flange portion disposed on an outer wall of the post, and the locking mechanism of each post hole includes an annular groove disposed in an inner wall of the post hole.

224 — Receiving the posts into the post holes when the first and second mating surfaces are attached.

226 — Urging the flared flange portions of the posts from a flared position to a collapsed position by the inner walls of the post holes.

228 — Reverting the flared flange portions of the posts back to their flared position when the flared flange portions reach the annular grooves to lock the posts and the post holes together.

TROLLING HEAD FOR A FISHING LURE

CROSS REFERENCE TO RELATED APPLICATIONS

This application is a non-provisional application of, and claims the benefit of the filing date of, U.S. provisional application 63/501,300, filed May 10, 2023, entitled: "TROLLING HEAD FOR FISHING LURE," the contents of which are incorporated herein by reference in their entirety.

TECHNICAL FIELD

The present disclosure relates to fishing lures and methods of making the same. More specifically, the disclosure relates to trolling heads for fishing lures having a fish eye mimic positioned in a thru-hole therein.

BACKGROUND

Trolling is a method of fishing where one or more fishing lines, often baited with lures, are drawn through the water. The trolling fishing lures may be pulled behind a moving boat, or by slowly winding the line in when fishing from a static position. The trolling method of fishing is often used to catch pelagic fish, such as salmon, kingfish or mackerel. Pelagic fish, living in the pelagic zone of oceans or lakes, are fish that are neither close to the bottom nor near the shore.

Fishing lures have long been used in place of bait, nets, or the like to catch a variety of different types of fish in many different environments. Trolling fishing lures are often designed to fish off shore and above the bottom.

Trolling fishing lures often include trolling heads (or heads) that are designed to mimic at least a portion of the body of the prey of the fish being sought after. The trolling head of a fishing lure is attachable to a fishing rod via fishing line. The trolling head often has a streamlined, often bullet shaped, contour on one end of the head (first end) that is attached to the fishing rod pulling the trolling head through the water. An opposing end (second end) of the trolling head may be attachable to a hook for snaring the fish and/or various features that may disguise the hook and/or mimic other portions of the prey's body.

However, trolling heads may be cumbersome to assemble onto a fishing line. This is especially the case when a user has to attach the trolling head to a fishing line by threading the fishing line through multiple holes or loops in the field.

Additionally, trolling heads of fishing lures don't always accurately resemble or mimic critical features, for example the eyes, of the prey they are supposed to resemble. Moreover, if the attachment mechanism of the fishing line to the trolling head requires that the fishing line pass over the feature that is being mimicked, the resemblance to the feature being mimicked may be reduced.

Accordingly, there is a need for a trolling head for a fishing lure that is easy to assembly onto a fishing line. More specifically, there is a need for a trolling head fishing lure that is easy to assemble onto a fishing line in the field. Moreover, there is a need to more accurately resemble one or more of the features, such as eyes, of prey that the fishing lure is designed to mimic.

BRIEF DESCRIPTION

The present disclosure offers advantages and alternatives over the prior art by providing a trolling head of a fishing lure that is easy to assemble to a fishing line in the field. More specifically, the fishing line need only be threaded through a single tunnel of the trolling head, which extends from one end of the trolling head to the other. The trolling head may have a fish eye mimic that resembles the blinking eyes of a fish. Further the tunnel of the trolling head guides the fishing line around the mimic of the fish eye, and not over the fish eye, in order to reduce the number of tunnels the fishing line has to be threaded through and to not obscure the resemblance of the fish eye mimic to an actual eye.

A trolling head in accordance with one or more aspects of the present disclosure includes a first and a second body portion. Each of the first and second body portions include a first end and a second end with a body portion thru-hole extending therebetween. Each body portion also includes a mating surface extending from the first end to the second end of the body portion. Each body portion also includes a groove disposed within the mating surface and extending from the first end to the second end. The mating surfaces of the first and second body portions are configured to attach together to form a trolling head body. The mating surfaces of the first and second body portions are also configured to attach together such that the grooves of the first and second body portions align to form a tunnel extending from a tunnel entrance, formed by the first ends of the first and second body portions, to a tunnel exit, formed by the second ends of the first and second body portions. The tunnel is sized to receive a fishing line therethrough. Additionally, the mating surfaces of the first and second body portions are configured to attach together such that the body portion thru-holes of the first and second body portions align to form a trolling head thru-hole, which extends through the trolling head body. The trolling head thru-hole is sized to receive a fish eye mimic therein.

Another trolling head in accordance with one or more aspects of the present disclosure includes a first body portion and a second body portion. The first body portion includes a first end and a second end with a body portion thru-hole extending therebetween. The first body portion also includes a mating surface extending from the first end of the first body portion to the second end of the first body portion. The first body portion also includes a groove disposed within the mating surface of the first body portion and extending from the first end to the second end of the first body portion. The first body portion also includes a plurality of posts disposed on the mating surface of the first body portion and extending outwardly therefrom. The second body portion includes a first end and a second end with a body portion thru-hole therebetween. The second body portion also includes a mating surface extending from the first end of the second body portion to the second end of the second body portion. The second body portion also includes a groove disposed within the mating surface of the second body portion and extending from the first end of the second body portion to the second end of the second body portion. The second body portion also includes a plurality of post holes disposed in the mating surface of the second body portion and extending at least partially into the second body portion. The mating surfaces of the first and second body portions are configured to attach together to form a trolling head body. The mating surfaces of the first and second body portions are also configured to attach together such that the grooves of the first and second body portions align to form a tunnel extending from a tunnel entrance, formed by the first ends of the first and second body portions, to a tunnel exit, formed by the second ends of the first and second body portions. The tunnel is sized to receive a fishing line therethrough. Additionally, the mating surfaces of the first and second body portions are configured to attach together such that the body portion thru-holes of the first and second body portions align to form a trolling head thru-hole, which extends through the trolling head. The trolling head thru-hole is sized to receive a fish eye mimic therein. Additionally, each post hole of the plurality of post holes is sized to receive a post of the plurality of posts when the mating surfaces of the first and second body portions are attached together. The posts fitting into the post holes are configured to affix and align the first and second body portions together.

A method of forming a trolling head for a fishing lure in accordance with one or more aspects of the present disclosure includes forming, via plastic injection molding process, a first body portion. The first body portion includes a first end and a second end with a body portion thru-hole therebetween. The first body portion also includes a mating surface extending from the first end to the second end. The first body portion also includes a groove disposed within the mating surface and extending from the first end to the second end. The first body portion also includes a plurality of posts disposed on the mating surface of the first body portion and extending outwardly therefrom. The method also includes forming, via plastic injection molding process, a second body portion. The second body portion includes a first end and a second end with a body portion thru-hole therebetween. The second body portion also includes a mating surface extending from the first end of the second body portion to the second end of the second body portion. The second body portion also includes a groove disposed within the mating surface of the second body portion and extending from the first end of the second body portion to the second end of the second body portion The second body portion also includes a plurality of post holes disposed in the mating surface of the second body portion and extending at least partially into the second body portion. The method also includes inserting each post hole of the plurality of post holes into a post of the plurality of posts to attach and align the mating surfaces of the first and second body portions together. The method also includes aligning the grooves of the first and second body portions to form a tunnel extending from the first ends of the first and second body portions to the second ends of the first and second body portions. The tunnel is sized to receive a fishing line therethrough. The method also includes aligning the body portion thru-holes of the first and second body portions to form a trolling head thru-hole sized to receive a fish eye mimic therein.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

BRIEF DESCRIPTION OF THE DRAWINGS

The disclosure will be more fully understood from the following detailed description taken in conjunction with the accompanying drawings, in which:

FIG. 10 depicts an example of a flow diagram of a method of forming a trolling head for a fishing lure and inserting a fishing line therein, according to aspects described herein;

FIG. 11 depicts an example of a flow diagram of a continuation of the method of FIG. 10; and FIG. 12 depicts an example of a flow diagram of a further continuation of the method of FIG. 10.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
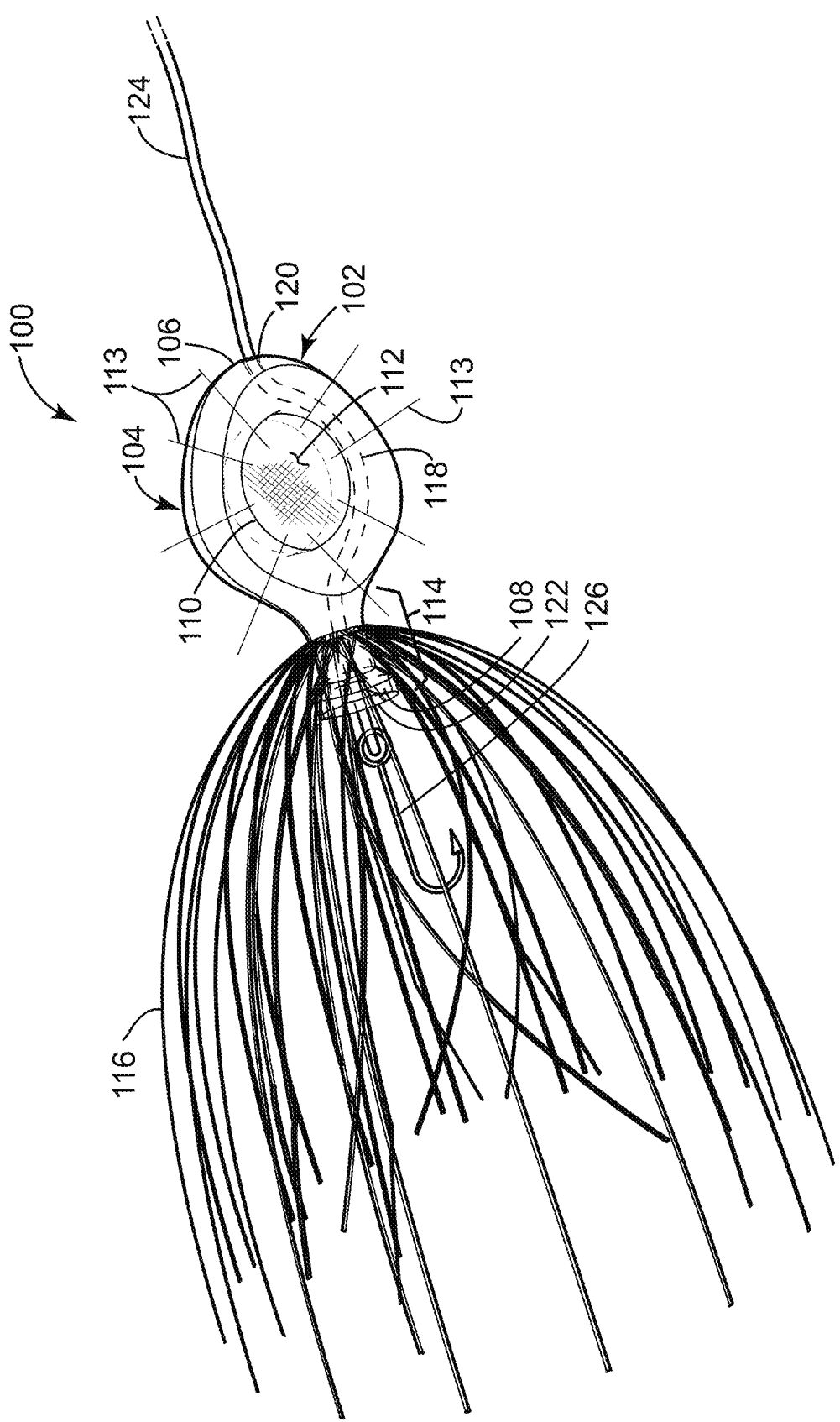
FIG. 1 depicts an example of a perspective view of a fishing lure having a trolling head, according to aspects described herein.

Referring to FIG. 1, an example is depicted of a perspective view of a fishing lure 100 having a trolling head 102, according to aspects described herein. The trolling head 102 includes a trolling head body 104. The trolling head body 104 includes a first (or upstream) end 106 and a second (or downstream) end 108 having a trolling head thru-hole 110 extending therebetween. The upstream (or first) end 106 may have a streamlined or generally bullet shaped contour to enable the trolling head 102 to be pulled easily through the water. The downstream (or second) end may have a stem section 114 to enable streamers 116, or other features that disguise or mimic prey of the fish being sought after (or fished), to be readily attached to the trolling head body 104.

The trolling head body 104 also includes a tunnel 118 that extends from a tunnel entrance 120, located at an apex of the first end 106, to a tunnel exit 122, located at the downstream most portion of the second end 108. The tunnel 118 extends through the trolling head body 104 around the trolling head thru-hole 110 and not through the trolling head thru-hole 110. The tunnel 118 is sized to have a fishing line 124 fed therethrough from the tunnel entrance 120 to the tunnel exit 122. The fishing line 124 may extend out of the upstream (first) end 106 of the trolling head 102 and attach to a fishing reel (not shown). The fishing lure 100 may also include a fish hook 126 that is attached to the fishing line 124, which extend out of the downstream (second) end 108 of the trolling head body 104. The fish hook 126 may be disguised by the streamers 116.

A fish eye mimic 112 may be positioned within (i.e., disposed within) the trolling head thru-hole 110. The fish eye mimic 112 may be affixed to the trolling head thru-hole 110 via an adhesive or other appropriate attachment mechanism. The fish eye mimic 112 mimics the eye of certain prey of the fish being sought after or fished for. The fish eye mimic 112 may include a lighting mechanism that flashes light 113 when in contact with water. The lighting mechanism may include a light emitting diode disposed in a circuit that flashes light 113 when in contact with water. An example of such a fish eye mimic may be an LED lighted eye having part number ED-1 sold by Weihai Tongfu Trading Co., LTD of Weihai City, Shandong Province, China. The trolling head thru-hole 110 is sized to receive the fish eye mimic 112. For example, the trolling head thru-hole 110 may be substantially 15 mm in diameter, or may be within a range of 12 to 20 mm in diameter.

Figure 2:
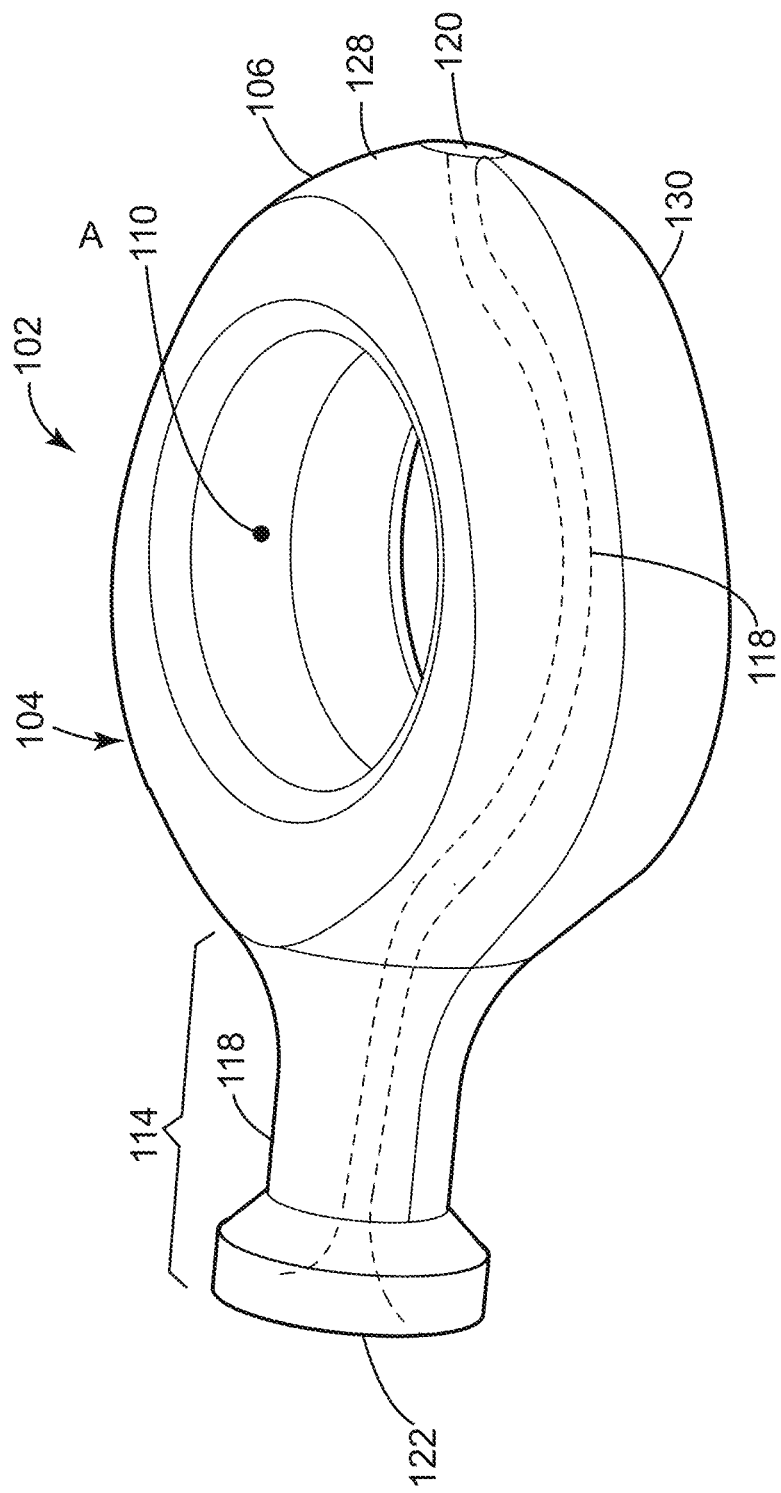
FIG. 2 depicts an example of a perspective view of the trolling head of FIG. 1 having a first body portion and a second body portion, according to aspects described herein.
Figure 3:
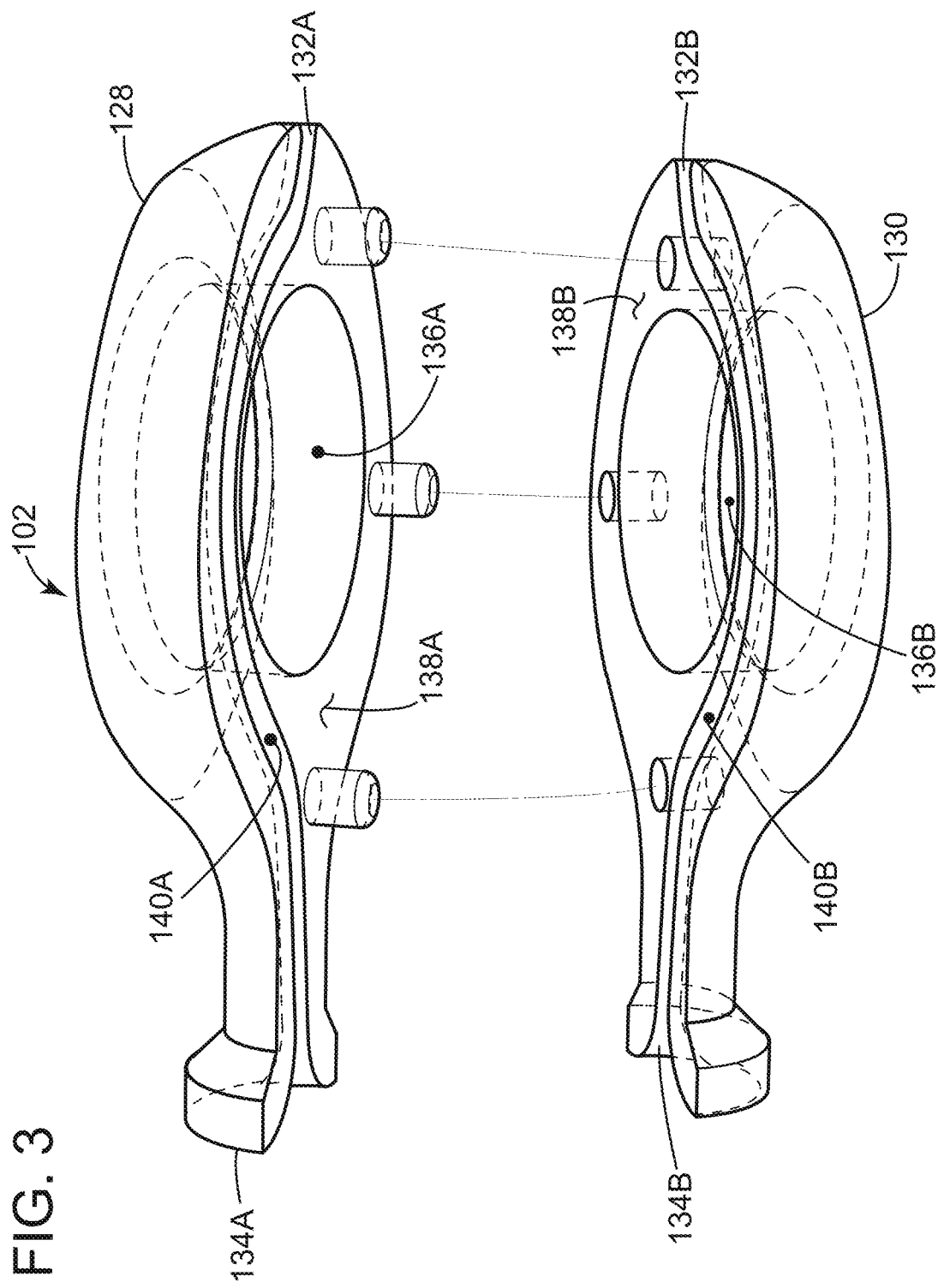
FIG. 3 depicts an example of an exploded perspective upper view of the trolling head of FIG. 2, according to aspects described herein.

Referring to FIGS. 2 and 3, an example is depicted of a perspective view (FIG. 2) and an exploded perspective view (FIG. 3) of the trolling head 102 having a first body portion 128 of the trolling head body 104 and a second body portion 130 of the trolling head body 104, according to aspects described herein. The first and second body portions 128, 130 may be formed via a plastic injecting molding process.

Each of the first and second body portions 128, 130 include a first end 132A, 132B and a second end 134A, 134B with a body portion thru-hole 136A, 136B extending therebetween. Each body portion 128, 130 also includes a mating surface 138A, 138B extending from the first end 132A, 132B to the second end 134A, 134B of the body portion 128, 130. Each body portion 128, 130 also includes a groove 140A, 140B disposed within the respective mating surface 138A, 138B and extending from the respective first end 132A, 132B to the respective second end 134A, 134B. The mating surfaces 138A, 138B of the respective first and second body portions 128, 130 are configured to attach together to form the trolling head body 104. The mating surfaces 138A, 138B of the first and second body portions 128, 130 are also configured to attach together such that the grooves 140A, 140B of the first and second body portions 128, 130 align to form the tunnel 118 extending from the tunnel entrance 120, formed by the respective first ends 132A, 132B of the first and second body portions 128, 130, to the tunnel exit 122, formed by the respective second ends 134A, 134B of the first and second body portions 128, 130. The tunnel 118 is sized to receive the fishing line 124 (see FIG. 1) therethrough. Additionally, the mating surfaces 138A, 138B of the first and second body portions 128, 130 are configured to attach together such that the body portion thru-holes 136A, 136B of the first and second body portions 128, 130 align to form the trolling head thru-hole 110, which extends through the trolling head body 104. The trolling head thru-hole 110 is sized to receive the fish eye mimic 112 (see FIG. 1) therein.

Figure 4:
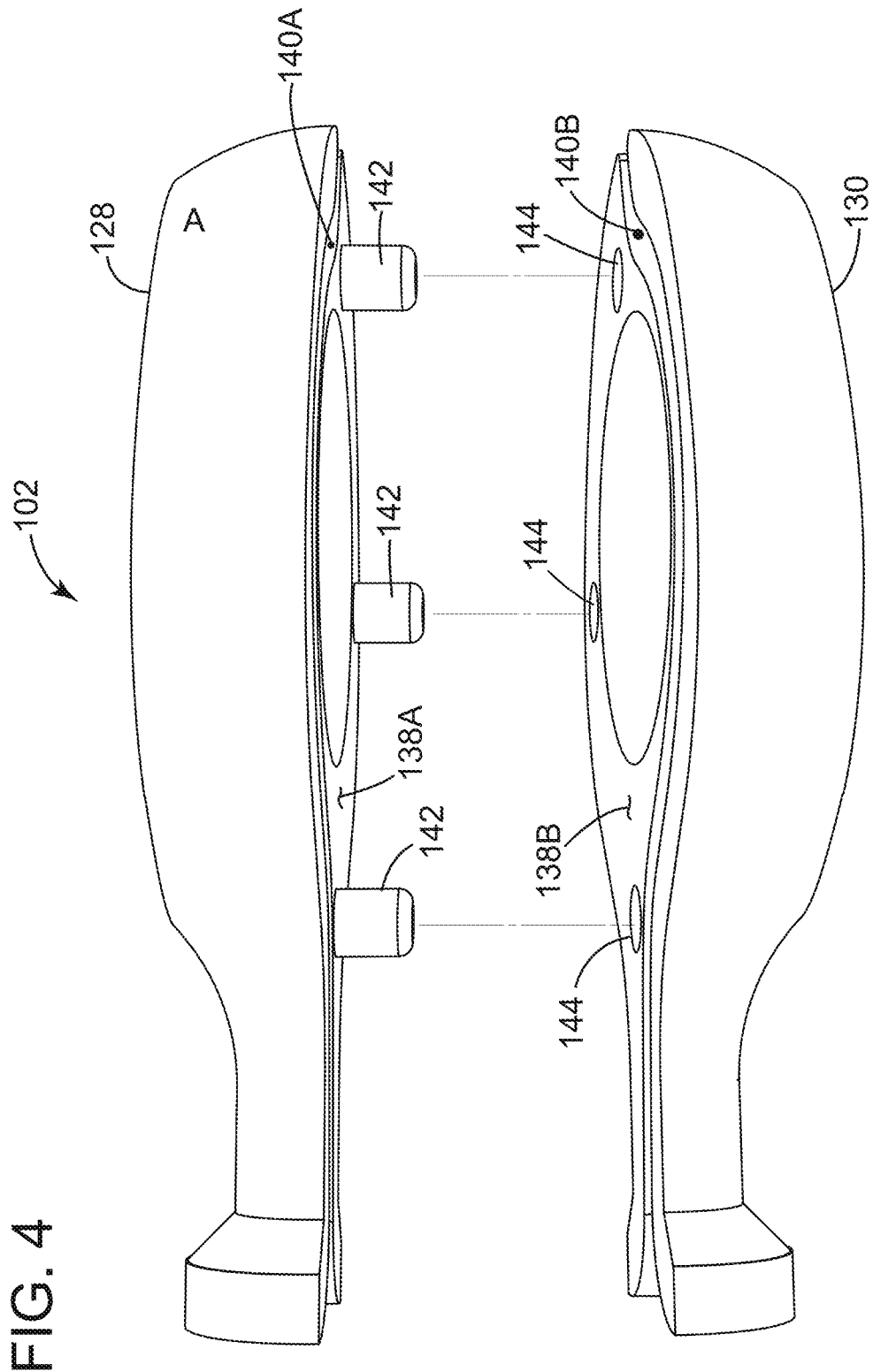
FIG. 4 depicts an example of an exploded perspective side view of the trolling head of FIG. 2, according to aspects described herein.
Figure 5:
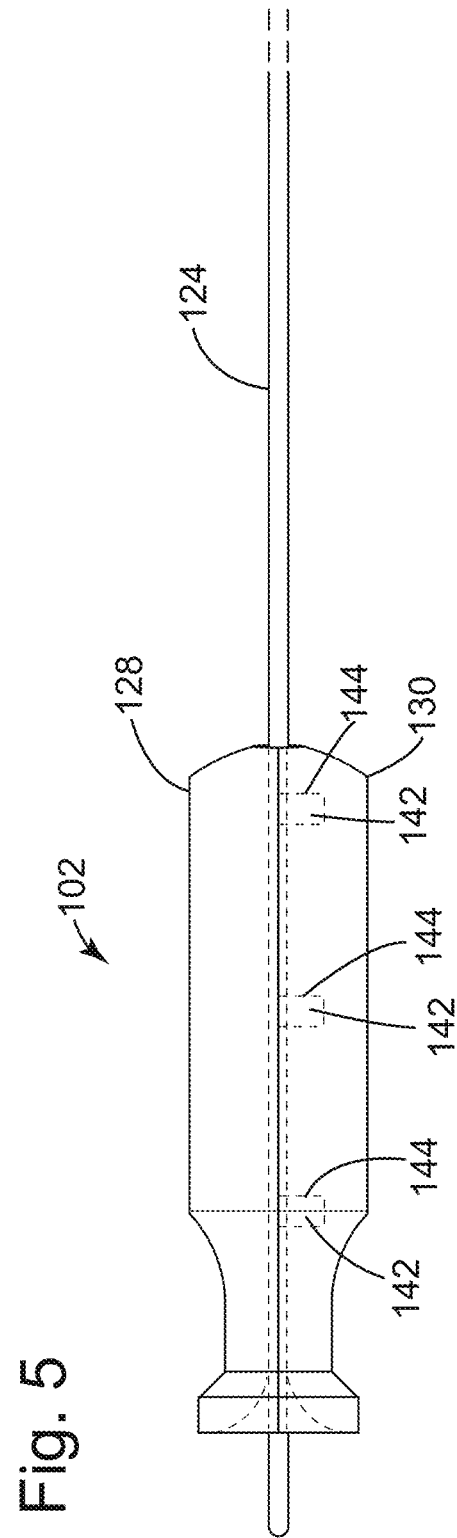
FIG. 5 depicts an example of a side view of the trolling head of FIG. 2, according to aspects described herein.

Referring to FIGS. 4 and 5, an example is depicted of an exploded perspective side view (FIG. 4) and a side view (FIG. 5) of the trolling head 102, according to aspects described herein. The trolling head 102 also includes a plurality of posts 142 disposed on the mating surface 138A of the first body portion 128 and extending outwardly therefrom. In the example illustrated in FIGS. 4 and 5, there are three posts 142 shown. However, there may be any number of posts 142 from two upwards.

The trolling head 102 also includes a plurality of post holes 144 disposed in the mating surface 138B of the second body portion 130 and extending at least partially into the second body portion 130. Each post hole 144 of the plurality of post holes 144 is sized to receive a post 142 of the plurality of posts 142 when the mating surfaces 138A, 138B of the first and second body portions 128, 130 are attached together (see FIG. 5) to affix the first and second body portions 128, 130 together. Again, there are three post holes 144 illustrated in FIGS. 4 and 5. However, there may be any number of post holes 144 from two upwards to match and receive the number of posts 142 which fit into the post holes 144.

Each post 142 of the plurality of posts 142 may include a first locking mechanism attached thereto and each post hole 144 of the plurality of post holes 144 may also include a second locking mechanism attached thereto. When the mating surfaces 138A, 138B of the first and second body portions 128, 130 are attached, the first and second locking mechanisms may lock together. The first and second locking mechanisms may be any appropriate locking mechanism that meets the parameters required for holding the first and second body portions 128, 130 together. For example, the first and second locking mechanisms may be as simple as applying adhesive to the posts 142 and/or post holes 144.

Figure 6:
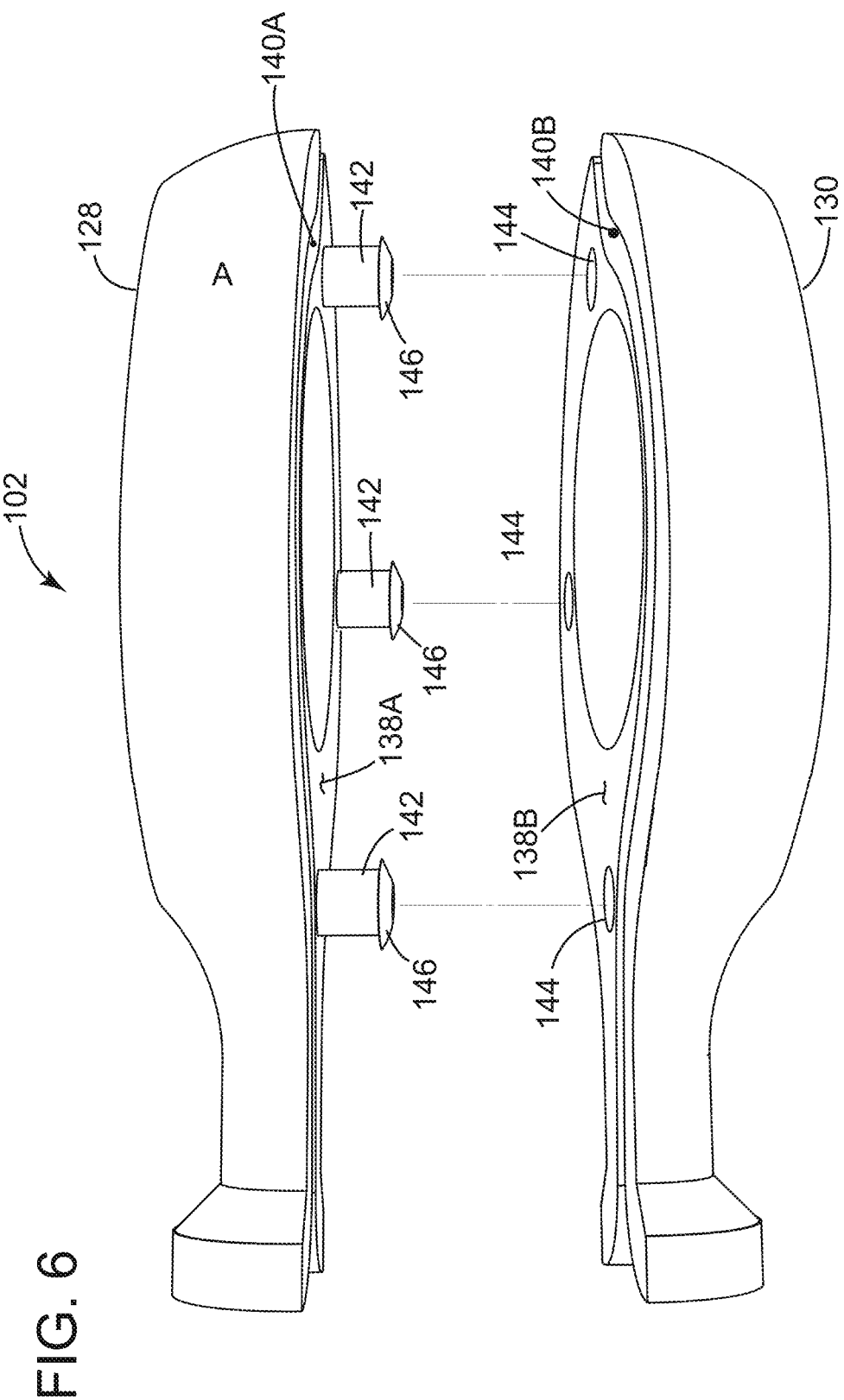
FIG. 6 depicts another example of an exploded perspective view of the trolling head of FIG. 2 having a first locking mechanism, which includes resilient annular flared flange portions disposed on posts of the first body portion, according to aspects described herein.

Referring to FIG. 6, an example is depicted of an exploded perspective view of the trolling head 102 having a first locking mechanism 146, which includes resilient annular flared flange portions 146 disposed on the posts 142 of the first body portion 128, according to aspects described herein. The flared flanged portions 146 are shown in FIG. 6 as being disposed on a distal end of each post 142. However, the flared flanged portions 146 may be disposed anywhere along the length of the posts 142.

Figure 7:
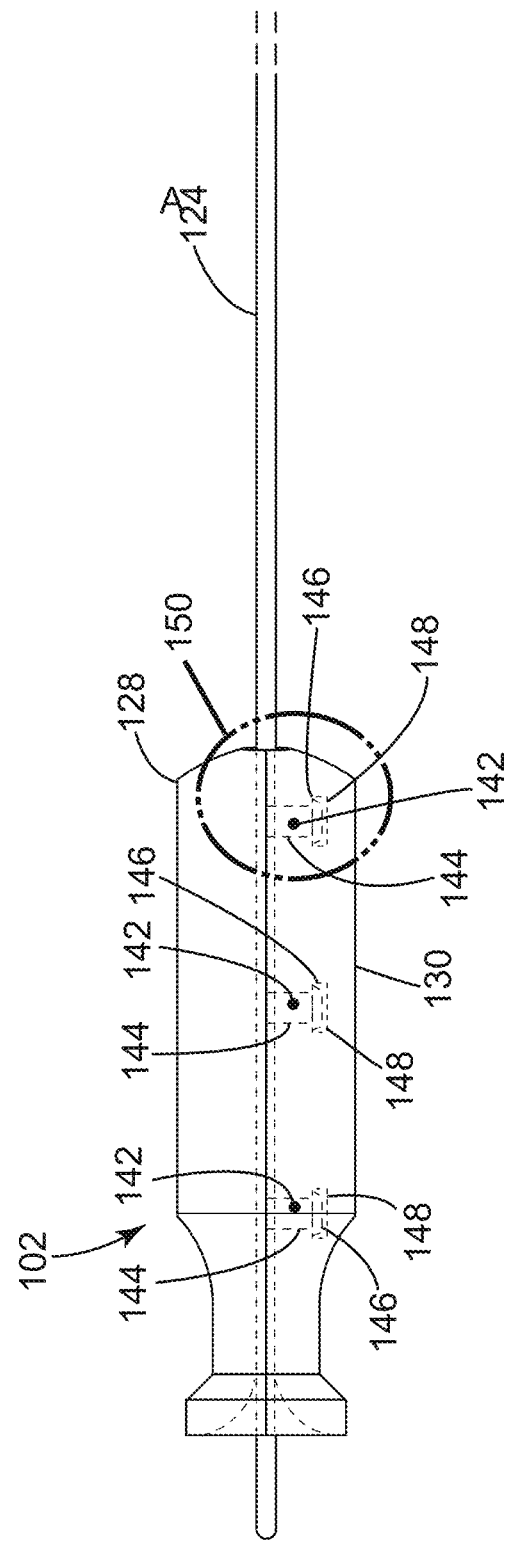
FIG. 7 depicts an example a side view of the trolling head of FIG. 2 having a second locking mechanism, which includes annular grooves disposed in post holes of the second body portion, according to aspects described herein.
Figure 7A:
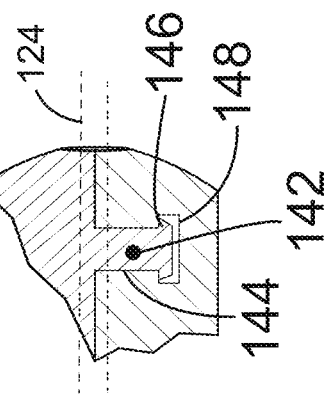
FIG. 7A depicts an example of an enlarged view of the circle 150 of FIG. 7, according to aspects described herein.

Referring also to FIGS. 7, and 7A an example is depicted of a side view (FIG. 7) and an enlarged view (FIG. 7A) of the circle 150 of the trolling head 102 having a second locking mechanism 148, which includes annular grooves 148 disposed in post holes 144 of the second body portion 130, according to aspects described herein. When the post holes 144 receive the posts 142 therein, the flared flange portions 146 of the posts 142 are urged from a flared position backwards to a collapsed position by the inner walls of the post holes 144 until the flared flange portions 146 of the posts 142 reach the annular grooves 148. Once the flared flange portions 146 reach the annular grooves 148, the flared flange portions 146 of the posts 142 then revert back to their flared position to lock the posts 142 and the post holes 144 together (see FIG. 7A).

Figure 8:
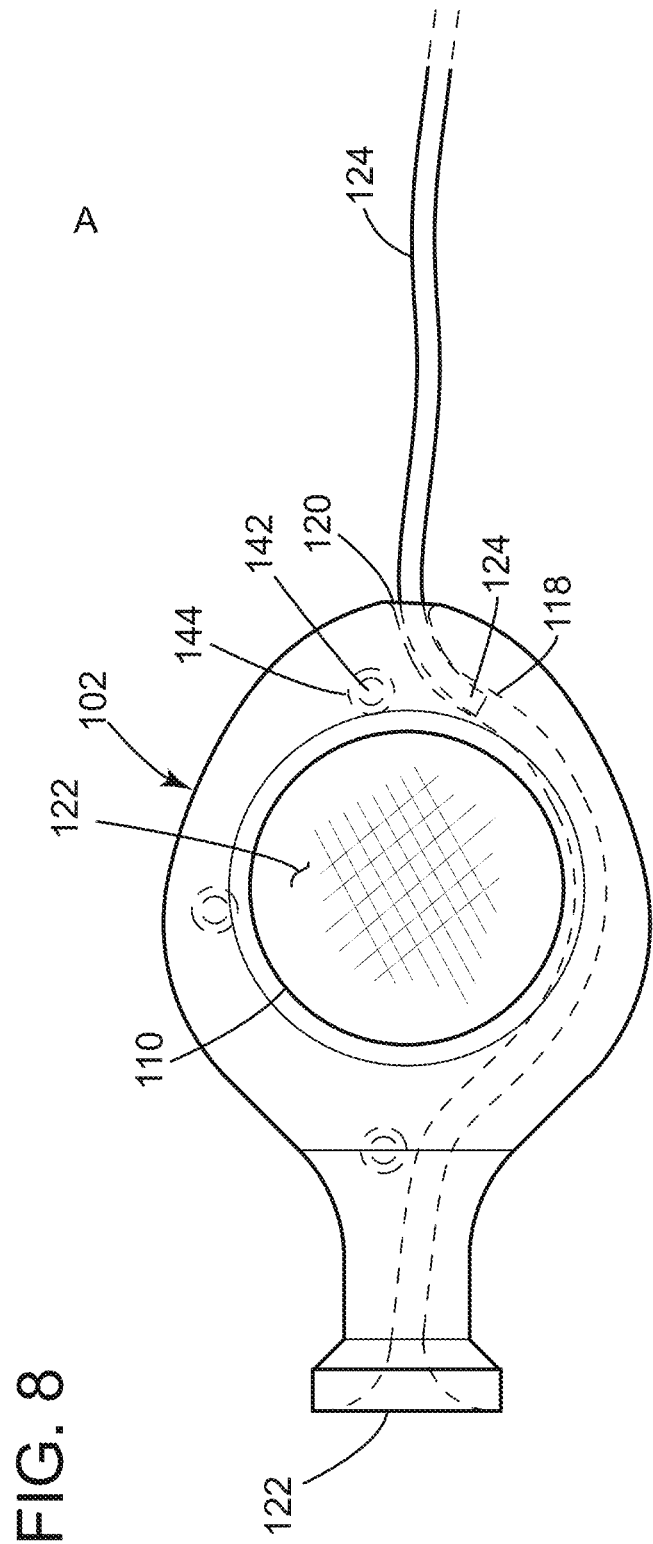
FIG. 8 depicts an example of a top view of a fishing line being partially threaded through the tunnel of the trolling head of FIG. 2, according to aspects described herein.
Figure 9:
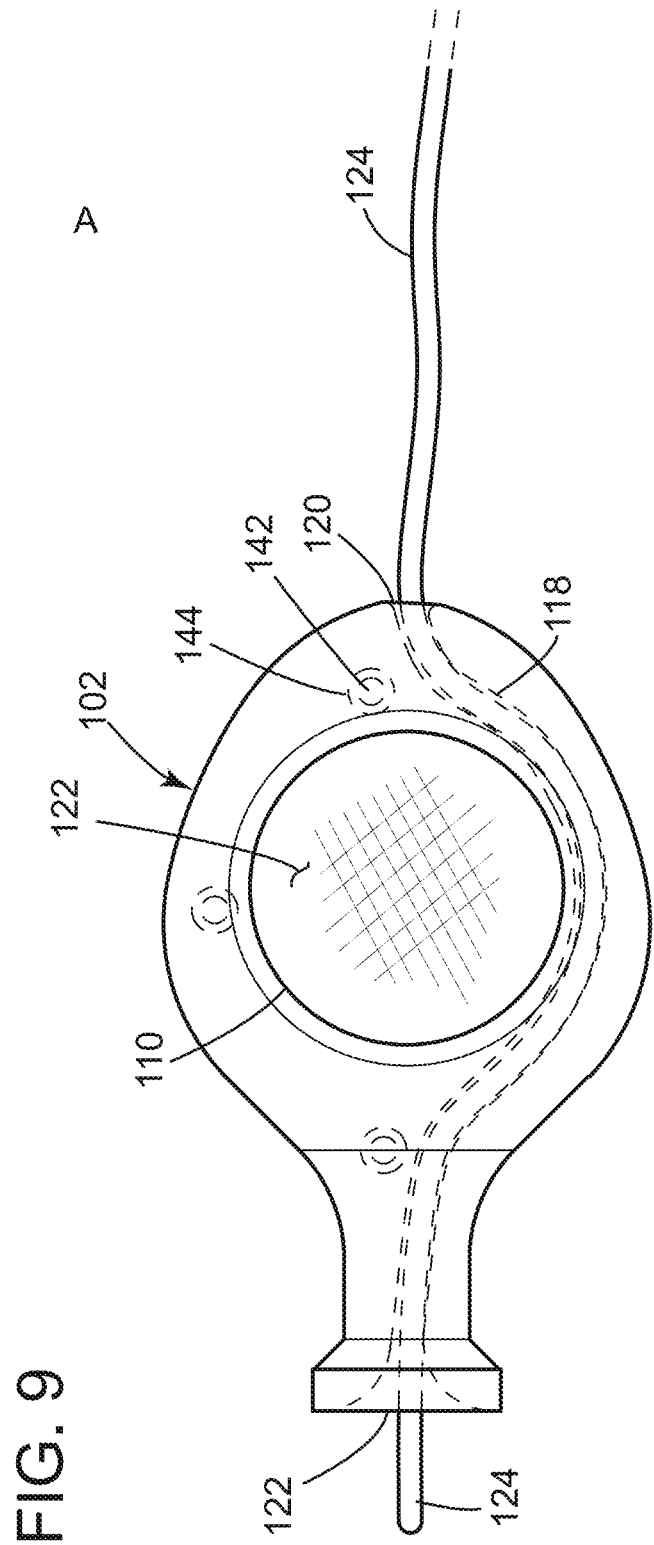
FIG. 9 depicts an example of a top view of a fishing line being fully threaded through the tunnel of the trolling head of FIG. 2, according to aspects described herein.

Referring to FIGS. 8 and 9 an example of a top view of a fishing line 124 being partially (FIG. 8) and then fully (FIG. 9) threaded through the tunnel of the trolling head 102, according to aspects described herein. In FIG. 8, the fishing line is threaded through the tunnel entrance 120 of the tunnel 118, wherein the distal end of the fishing line follows the contour of the tunnel around the fish eye mimic 112. In FIG. 9, the fishing line is threaded fully through tunnel 118 and out the tunnel exit 122.

Advantageously, a user only has to thread the fishing line 124 through a single hole (i.e., the tunnel entrance 120), because the tunnel 118 goes around the trolling head thru-hole 110 and the fish eye mimic 112. Also advantageously, because the tunnel 118 routes the fishing line 124 around the trolling head thru-hole 110 and fish eye mimic 112, the fishing line 124 does not extend over the fish eye mimic and, therefore, does not reduce the resemblance of the fish eye mimic 112 to that of a real fish eye. These advantageous features are opposed to prior art trolling heads that may thread a fishing line first through a first tunnel extending from the upstream end of the trolling head to the upstream end of the trolling head thru-hole, then over the fish eye mimic, then through a second tunnel extending from the downstream end of the trolling head thru-hole to the downstream end of the trolling head. Accordingly, the trolling head 102 of the present disclosure is easier to attach a fishing line 124 to, and the fish eye mimic 112 more closely resembles an actual fish eye.

Referring to FIG. 10, an example is depicted of a flow diagram of a method 200 of forming the trolling head 102 for the fishing lure 100 and attaching the fishing line 124 thereto, according to aspects described herein. The method begins at step 202, which includes forming the trolling head 102. The trolling head 102 includes the trolling head body 104, which includes the first end 106 and the second end 108 and having the trolling head thru-hole 110 extend therebetween. The trolling head thru-hole 110 is configured to receive the fish eye mimic 112 therein.

The trolling head 102 also includes the tunnel 118, which extends from the tunnel entrance 120 disposed in the first end 106 of the trolling head body 104 to the tunnel exit 122 disposed in the second end 108 of the trolling head body 104. The tunnel 118 is configured to receive the fishing line 124 therethrough and to advantageously route the fishing line 124 around the trolling head thru-hole 110, rather than through the trolling head thru-hole 110 and rather than over the fish eye mimic 112.

At 204 of the method 200, the fishing line 124 is threaded through the tunnel 118 from the tunnel entrance 120 to the tunnel exit 122, wherein the threaded fishing line 124 is routed around the trolling head thru-hole 110.

Referring to FIG. 11, an example is depicted of a flow diagram of a continuation of the method 200, according to aspects described herein. More specifically, FIG. 11 depicts an expansion of the formation of the trolling head 102, i.e., step 202.

At 206, the formation of the trolling head 102 begins with forming, via plastic injection molding process, the first body portion 128 of the trolling head body 104. The first body portion 128 includes the first end 132A and the second end 134A with a body portion thru-hole 136A therebetween. The first body portion 128 also includes the mating surface 138A extending from the first end 132A to the second end 134A of the first body portion 128. The groove 140A is disposed within the mating surface 138A and extends from the first end 132A to the second end 134A of the first body portion 128. The plurality of posts 142 are disposed on the mating surface 138A of the first body portion 128 and extend outwardly therefrom.

At 208, the second body portion 130 of the trolling head body 104 is formed via plastic injection molding process. The second body portion 130 includes the first end 132B and a second end 134B of the second body portion 130, with the body portion thru-hole 136B therebetween. The second body portion 130 also includes the mating surface 138B extending from the first end 132B to the second end 134B of the second body portion 130. The groove 140B is disposed within the mating surface 138B and extends from the first end 132B to the second end 134B of the second body portion 130. A plurality of post holes 144 are disposed on the mating surface 138B of the second body portion 130 and extend at least partially into the second body portion 130.

At 210, each post hole 144 of the plurality of post holes 144 is inserted into a post 142 of the plurality of posts 142 to attach and align the mating surfaces 138A, 138B of the first and second body portions 128, 130 together.

At 212, the body portion thru-holes 136A, 136B of the first and second body portions 128, 130 are aligned to form the trolling head thru-hole 110.

At 214, the grooves 140A, 140B of the first and second body portions 128, 130 are aligned to form the tunnel 118. The tunnel entrance 120 of the tunnel 118 is formed from the first ends 132A, 132B of the first and second body portions 128, 130, and the tunnel exit 122 of the tunnel 118 is formed from the second ends 134A, 134B of the first and second body portions 128, 130.

Referring to FIG. 12, an example is depicted of a flow diagram of a further continuation of the method 200, according to aspects described herein. More specifically, FIG. 12 depicts the use of a first locking mechanism 146 disposed on the posts 142 and a second locking mechanism disposed on the post holes 144, which lock together to attach the first and second body portions 128, 130 and to form the trolling head body 104.

At 216, the method 200 continues wherein each post 142 of the plurality of posts 142 includes a first locking mechanism 146 attached thereto. Additionally, each post hole 144 of the plurality of post holes 144 includes a second locking mechanism 148 attached thereto.

At 218, the plurality of posts 142 are secured to the plurality of post holes 144, when the mating surfaces 138A, 138B of the first and second body portions 128, 130 are attached, by locking the first and second locking mechanisms 146, 148 together. The locking mechanisms 146, 148 may be any appropriate mechanisms that are operable to meet the parameters required for securing the first and second body portions 128, 130 together.

At 220, an example of a form of the first and second locking mechanisms 146, 148 is where the first and second locking mechanisms include an adhesive.

At 222, an alternative example of the first locking mechanism 146 is where the locking mechanism 146 of each post 142 includes a resilient annular flared flange portion 146 (see FIG. 6) disposed on an outer wall of the post 142. Additionally, an alternative example of the second locking mechanism 148 is where the locking mechanism 148 of each post hole 144 includes an annular groove 148 disposed in an inner wall of the post hole 144.

At 224, the posts 142 are received into the post holes 144 when the first and second mating surfaces 138A, 138B are attached.

At 226, the flared flange portions 146 of the posts 142 are urged from a flared position to a collapsed position by the inner walls of the post holes 144.

At 228, the flared flange portions 146 of the posts 142 revert back to their flared position when the flared flange portions 146 reach the annular grooves 148 to lock the posts 142 and the post holes 144 together.

Advantageously, a user of the aforementioned trolling head 102 only has to thread the fishing line 124 through a single the tunnel 118 that routes the fishing line 124 around the trolling head thru-hole 110 and the fish eye mimic 112. Accordingly, the trolling head 102 of the present disclosure is easier to attach a fishing line 124 in the field than other prior art trolling heads.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A trolling head comprising:
   a first and a second body portion, each comprising:
      a first end having a bullet shaped contour and an opposing second end with a body portion thru-hole therebetween, the thru-hole extending entirely through the first or second body portion,
      a mating surface extending from the first end to the second end,
      a groove disposed within the mating surface and curving substantially 180 degrees around a perimeter of the body portion thru-hole without intersecting the perimeter of the body portion thru-hole from the first end to the second end;
   wherein the mating surfaces of the first and second body portions are configured to attach together such that the grooves of the first and second body portions align to form a tunnel extending from a tunnel entrance located at an apex of the bullet shaped contour of the first ends to a tunnel exit located at the opposing second ends of the first and second body portions, the tunnel being sized to receive a fishing line therethrough, and such that the body portion thru-holes of the first and second body portions align to form a trolling head thru-hole sized to receive a fish eye mimic therein;
   wherein the tunnel curves substantially 180 degrees around a perimeter of the trolling head thru-hole, does not intersect the perimeter of the trolling head thru-hole and does not pass through the trolling head thru-hole, such that the tunnel is configured to guide the fishing line around the fish eye mimic and not over the fish eye mimic.

2. The trolling head of claim 1, comprising:
   a plurality of posts disposed on the mating surface of the first body portion and extending outwardly therefrom; and
   a plurality of post holes disposed in the mating surface of the second body portion and extending at least partially into the second body portion;
   wherein each post hole of the plurality of post holes is sized to receive a post of the plurality of posts when the mating surfaces of the first and second body portions are attached together to affix the first and second body portions together.

3. The trolling head of claim 2, comprising:
   each post of the plurality of posts includes a first locking mechanism attached thereto;
   each post hole of the plurality of post holes includes a second locking mechanism attached thereto; and
   wherein when the mating surfaces of the first and second body portions are attached, the first and second locking mechanism lock together.

4. The trolling head of claim 3, wherein the first and second locking mechanisms comprise an adhesive.

5. The trolling head of claim 3, comprising:
   the locking mechanism of each post including a resilient annular flared flange portion disposed on an outer wall of the post; and
   the locking mechanism of each post hole including an annular groove disposed in an inner wall of the post hole;
   wherein, when the post holes receive the posts, the flared flange portions of the posts are urged from a flared position backwards to a collapsed position by the inner walls of the post holes until the flared flange portions of the posts reach the annular grooves, whereby the flared flange portions of the posts then revert back to their flared position to lock the posts and the post holes together.

6. The trolling head of claim 2, wherein the plurality of posts comprise at least three posts and the plurality of post holes comprise at least three post holes.

7. The trolling head of claim 1, wherein the trolling head thru-hole is 15 mm in diameter.

8. The trolling head of claim 1, wherein the fish eye mimic is affixed to the trolling head thru-hole via adhesive.

9. The trolling head of claim 1, wherein the fish eye mimic comprises a lighting mechanism that flashes light when in contact with water.

10. The trolling head of claim 9, wherein the lighting mechanism comprises a light emitting diode.

11. A trolling head comprising:
    a first body portion comprising:
       a first end having a bullet shaped contour and an opposing second end with a body portion thru-hole therebetween, the thru-hole extending entirely through the first body portion,
       a mating surface extending from the first end to the second end,
       a groove disposed within the mating surface and curving around a perimeter of the body portion thru-hole without intersecting the perimeter of the body portion thru-hole from the first end to the second end, and
       a plurality of posts disposed on the mating surface of the first body portion and extending outwardly therefrom; and
    a second body portion comprising:
       a first end having a bullet shaped contour and an opposing second end with a body portion thru-hole therebetween, the thru-hole extending entirely through the second body portion, a mating surface extending from the first end to the second end, a groove disposed within the mating surface and curving around a perimeter of the body portion thru-hole without intersecting the perimeter of the body portion thru-hole from the first end to the second end; and a plurality of post holes disposed in the mating surface of the second body portion and extending at least partially into the second body portion;

wherein the mating surfaces of the first and second body portions are configured to attach together such that the grooves of the first and second body portions align to form a tunnel extending from a tunnel entrance located at an apex of the bullet shaped contour of the first ends to a tunnel exit located at the opposing second ends of the first and second body portions, the tunnel being sized to receive a fishing line therethrough, and such that the body portion thru-holes of the first and second body portions align to form a trolling head thru-hole sized to receive a fish eye mimic therein;

wherein the tunnel curves substantially 180 degrees around a perimeter of the trolling head thru-hole, does not intersect the perimeter of the trolling head thru-hole and does not pass through the trolling head thru-hole, such that the tunnel is configured to guide the fishing line around the fish eye mimic and not over the fish eye mimic; and wherein each post hole of the plurality of post holes is sized to receive a post of the plurality of posts when the mating surfaces of the first and second body portions are attached together to affix and align the first and second body portions together.

12. The trolling head of claim 11, comprising:
each post of the plurality of posts includes a first locking mechanism attached thereto;
each post hole of the plurality of post holes includes a second locking mechanism attached thereto; and
wherein when the mating surfaces of the first and second body portions are attached, the first and second locking mechanism lock together.

13. The trolling head of claim 12, wherein the first and second locking mechanisms comprise an adhesive.

14. The trolling head of claim 11, wherein the plurality of posts comprise at least three posts and the plurality of post holes comprise at least three post holes.

15. The trolling head of claim 11, wherein the fish eye mimic is affixed to the trolling head thru-hole via adhesive.

16. A method of forming a trolling head for a fishing lure and attaching a fishing line thereto, the method comprising:
forming a trolling head body from a plastic material via a plastic injection molding process, the trolling head body comprising a first end having a bullet shaped contour and an opposing second end and having a trolling head thru-hole extending therebetween, the trolling head thru-hole extending entirely through the trolling head body, the trolling head thru-hole configured to receive a fish eye mimic therein;
extending a tunnel from a tunnel entrance disposed in an apex of the bullet shaped contour of the first end of the trolling head body to a tunnel exit disposed in the opposing second end of the trolling head body, wherein the tunnel curves substantially 180 degrees around a perimeter of the trolling head thru-hole, does not intersect the perimeter of the trolling head thru-hole and does not pass through the trolling head thru-hole, such that the tunnel is configured to guide a fishing line around the trolling head thru-hole; and
threading the fishing line through the tunnel from the tunnel entrance to the tunnel exit, wherein the threaded fishing line is routed around the trolling head thru-hole.

17. The method of claim 16, wherein forming a trolling head body further comprises:
forming, via plastic injection molding process, a first body portion, the first body portion comprising:
a first end and a second end with a body portion thru-hole therebetween,
a mating surface extending from the first end to the second end,
a groove disposed within the mating surface and extending from the first end to the second end, the groove curving around a perimeter of the body portion thru-hole without intersecting the perimeter of the body portion thru-hole, and
a plurality of posts disposed on the mating surface of the first body portion and extending outwardly therefrom;
forming, via plastic injection molding process, a second body portion, the second body portion comprising:
a first end and a second end with a body portion thru-hole therebetween,
a mating surface extending from the first end to the second end,
a groove disposed within the mating surface and extending from the first end to the second end, the groove curving around a perimeter of the body portion thru-hole without intersecting the perimeter of the body portion thru-hole, and
a plurality of post holes disposed in the mating surface of the second body portion and extending at least partially into the second body portion;
inserting each post hole of the plurality of post holes into a post of the plurality of posts to attach and align the mating surfaces of the first and second body portions together;
aligning the body portion thru-holes of the first and second body portions to form the trolling head thru-hole; and
aligning the grooves of the first and second body portions to form the tunnel, wherein the tunnel entrance is formed from the first ends of the first and second body portions, and wherein the tunnel exit is formed from the second ends of the first and second body portions.

18. The method of claim 17, wherein each post of the plurality of posts includes a first locking mechanism attached thereto, and each post hole of the plurality of post holes includes a second locking mechanism attached thereto, the method further comprising:
securing the plurality of posts to the plurality of post holes, when the mating surfaces of the first and second body portions are attached, by locking the first and second locking mechanisms together.

19. The method of claim 18, wherein the first and second locking mechanisms comprise an adhesive.

20. The method of claim 18, wherein the locking mechanism of each post includes a resilient annular flared flange portion disposed on an outer wall of the post, and the locking mechanism of each post hole includes an annular groove disposed in an inner wall of the post hole, the method further comprising:
receiving the posts into the post holes when the first and second mating surfaces are attached;

urging the flared flange portions of the posts from a flared position to a collapsed position by the inner walls of the post holes; and reverting the flared flange portions of the posts back to their flared position when the flared flange portions reach the annular grooves to lock the posts and the post holes together.

\* \* \* \* \*